United States Patent [19]
Lundahl

[11] 3,973,377
[45] *Aug. 10, 1976

[54] COMPACTING METHOD FOR STACKING BULK HAY

[75] Inventor: Ezra Cordell Lundahl, Idaho Falls, Idaho

[73] Assignee: Ezra C. Lundahl Inc., Logan, Utah

[*] Notice: The portion of the term of this patent subsequent to Oct. 30, 1990, has been disclaimed.

[22] Filed: Mar. 12, 1973

[21] Appl. No.: 340,409

Related U.S. Application Data

[62] Division of Ser. No. 195,709, Nov. 4, 1971, Pat. No. 3,744,228.

[52] U.S. Cl. .................................. 56/1; 56/DIG. 2
[51] Int. Cl.² .................................. A01D 91/00
[58] Field of Search .................. 56/341, 344–360, 56/1, DIG. 2; 214/519

[56] References Cited
UNITED STATES PATENTS

| | | | |
|---|---|---|---|
| 523,707 | 7/1894 | Keith | 56/341 |
| 3,556,327 | 1/1971 | Garrison | 56/341 X |
| 3,691,741 | 9/1972 | White et al. | 56/341 X |
| 3,768,679 | 10/1973 | Lundahl | 214/519 |

FOREIGN PATENTS OR APPLICATIONS

| | | | |
|---|---|---|---|
| 951,698 | 3/1964 | United Kingdom | 56/341 |

*Primary Examiner*—J.N. Eskovitz
*Attorney, Agent, or Firm*—Lynn G. Foster

[57] ABSTRACT

A method for stacking bulk hay comprising picking up hay from the field, elevating the same and distributing the crop therefrom into the receptacle of a hay wagon, the hay in the receptacle being vertically compacted from time to time by a compacting head mounted for vertical reciprocal movement within the receptacle, resulting in a self-contained stack of compacted hay. Hay is permitted to be delivered into the wagon at an accumulator site during the compacting operation.

1 Claim, 9 Drawing Figures

COMPACTING METHOD FOR STACKING BULK HAY

BACKGROUND

This application is a division of my copending U.S. patent application Ser. No. 195,709, filed Nov. 4, 1971, now U.S. Pat. No. 3,744,228.

1. Field of Invention

This invention relates to hay wagons and particularly to methods for compacting and transporting bulk hay and the like.

2. Prior Art

As is well known, hay is an essential feed for livestock and, consequently, hay production is an important agricultural activity. Hay is produced during the summer and is stored for feeding to the livestock during the winter. In many parts of the country, hay is packed into bales, weighing approximately 50–100 pounds, which are packed into barns, sheds, or the like, for storage and are removed, as needed, for delivery to the livestock. However, in other parts of the country, particularly in parts of the West, where mountainous terrain and heavy snows may make it difficult or impossible to deliver the hay to the livestock in winter, it is customary to store the hay, without baling, in stacks in the field. Historically, this has been accomplished by manually loading the hay from the field onto a wagon and, when the wagon is filled, from the wagon onto a stack. Obviously, much time and effort is required for such an operation. Furthermore, hay is frequently gathered in a race against time before an oncoming storm, since hay which is gathered and stacked or baled, when wet, is subject to rotting and spontaneous combustion. The latter is especially dangerous since it can cause fires which may destroy the hay and spread to adjacent buildings and fields. If the hay is gathered dry, it is less susceptible to such rain damage, even if the hay is simply stacked, since the rain normally penetrates only the outer layers of the hay stack, which can be subsequently dried by the sun. However, some possibility of such rain damage still exists. Moreover, repeated wetting and drying of the outer layers tends to make the leaves become brittle and crumble away, leaving only the stems and greatly reducing the nutritional value of the hay. Baled hay is much less susceptible to such damage since the compaction of the hay during baling causes the hay to be much more dense and less permeable to the rain. Unfortunately, bales are conventionally secured with wire or string which is inedible by livestock. Moreover, where access is difficult or impossible for delivering bales to the livestock, access is frequently equally difficult or impossible for removing the wires or string from stacked bales.

BRIEF SUMMARY AND OBJECTS OF INVENTION

These disadvantages of the prior art are overcome with the present invention and a hay gathering methods are disclosed which provides most of the advantages of both stacked and baled hay, while eliminating most of the disadvantages. Moreover, the technique of the present invention greatly reduces the time and effort required for hay gathering operations.

The advantages of the present invention are preferably attained by providing bulk hay methods for loading the loose hay from the ground into the wagon, compacting the hay on the wagon, and unloading the compacted hay to provide a compacted stack which is self-contained and requires no inedible securing means.

Accordingly, it is an object of the present invention to provide improved methods for gathering hay.

Another object of the present invention is to provide methods for compacting a wagon-load of hay.

A further object of the present invention is to provide methods for providing a compacted stack of hay which is self-contained and requires no inedible securing means.

A specific object of the present invention is to provide bulk hay methods for loading loose hay from the ground into the receptacle, for compacting the hay in the receptacle, and for unloading a compacted stack of hay from a receptacle.

These and other objects and features of the present invention will be apparent from the following detailed description, taken with reference to the accompanying drawing.

DETAILED DESCRIPTION OF ILLUSTRATED EMBODIMENT

Figure 1:
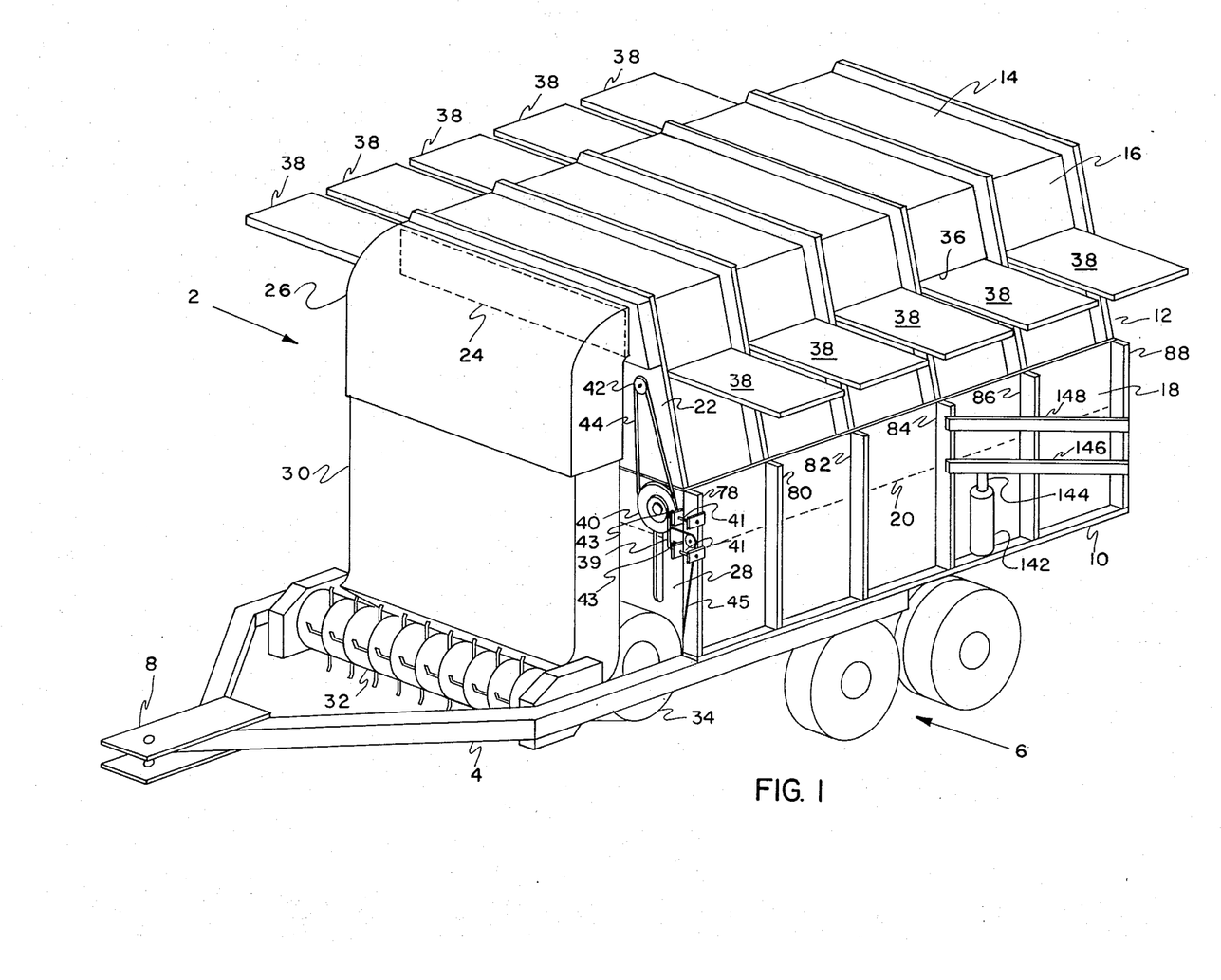
FIG. 1 is an isometric view of a hay wagon embodying the present invention.

In that form of the present invention chosen for purposes of illustration, FIG. 1 shows a hay wagon, indicated generally at 2, having a frame 4, supported by suitable suspension means 6, and having means, such as hitch 8, for permitting the wagon 2 to be pulled by a tractor or the like. The suspension means 6 may be of any suitable type, but is preferably of the type shown and described in my copending U.S. patent application Ser. No. 117,574, filed Feb. 22, 1971, now U.S. Pat. No. 3,715,129, issued Feb. 6, 1973.

Figure 2:
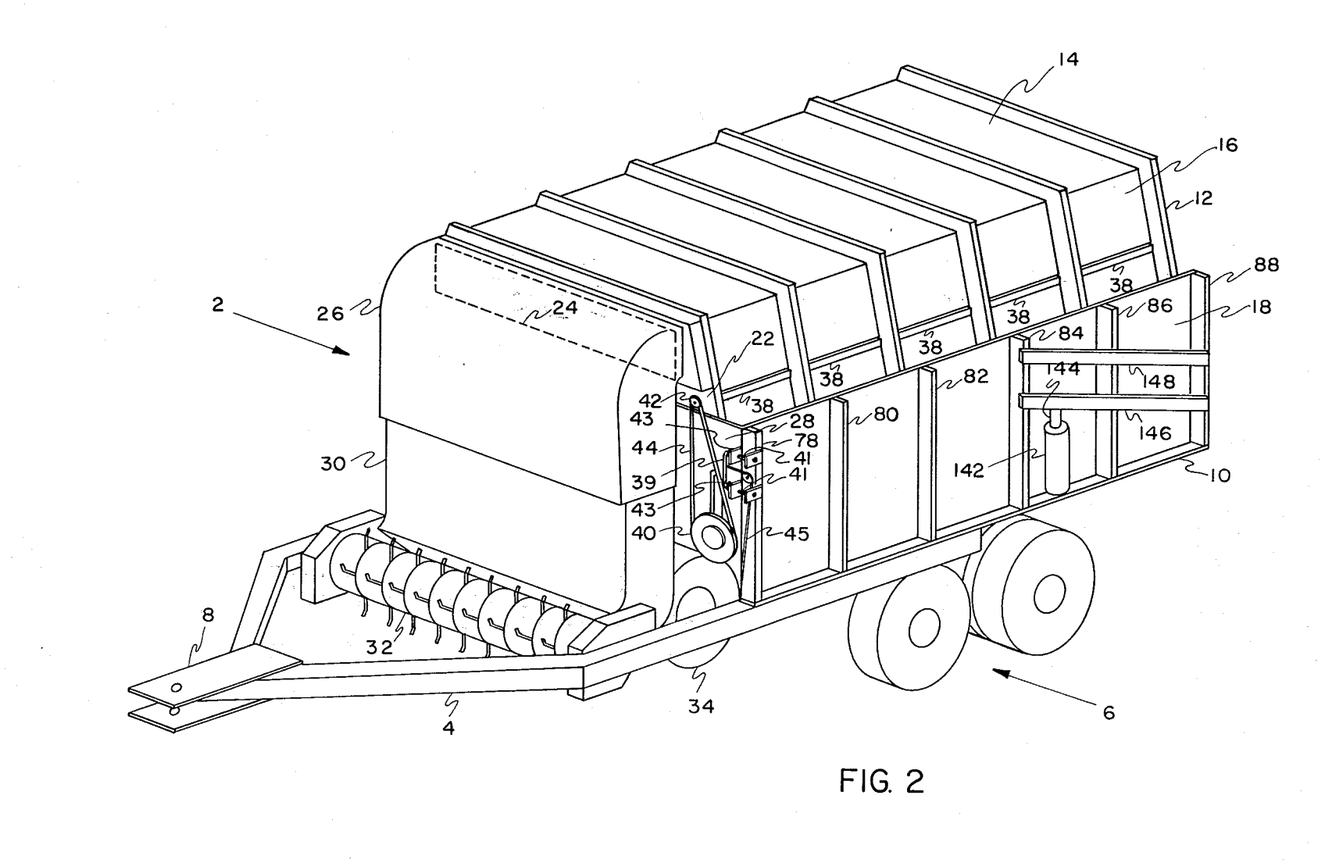
FIG. 2 is an isometric view of the hay wagon of FIG. 1 during the compacting operation.

A generally box-like, open-topped receptacle 10 is mounted on the frame 4 and a compacting head 12 is mounted for vertical, reciprocal movement within the receptacle 10 between an upper position, as seen in FIG. 1, and a lower position, as seen in FIG. 2, to compact hay within the receptacle 10, as more fully described hereinafter. The compacting head 12 is hollow and is generally in the form of a truncated pyramid having a substantially flat top 14 and inclined side walls 16 extending outward and downward from the top 14 to slidingly engage the side walls 18 of receptacle 12 at a point below the upper edge thereof, as indicated at 20. The front wall 22 of the compacting head 12 is formed with an opening 24 and a chute 26 is disposed about the opening 24 and is secured to the front wall 22 of compacting head 12 by suitable means, such as welding or bolts. The chute 26 projects forwardly from front wall 22 a sufficient distance to clear the front wall 28 of receptacle 10 and then extends downward into telescoping relation about a lower chute 30. The lower chute 30 preferably forms part of a pneumatic delivery system, including a rotary rake 32 and blower 34, for delivering hay from the ground to the interior of wagon 2 through opening 24. The hay delivery system is preferably of the type shown and described in my copending U.S. patent application, Ser. No. 195,549, filed Nov. 4, 1971, now U.S. Pat. No. 3,734,568, issued May 22, 1973. However, it will be apparent that other means could be employed to pick the loose hay from the ground and deliver it through opening 24 into the interior of the wagon 2.

Preferably, the side walls 16 of the compacting head 12 are each formed with a slot 36 through which accumulator doors 38 are movable horizontally, under the control of bracket 39, pulleys 40 and 42 and chain 44, to form an accumulator chamber which permits continued loading of loose hay into the wagon 2 during the compacting operation, as described in detail in my copending patent application, Ser. No. 195,609, filed Nov. 4, 1971, now U.S. Pat. No. 3,768,679 issued Oct. 30, 1973.

Figure 4:
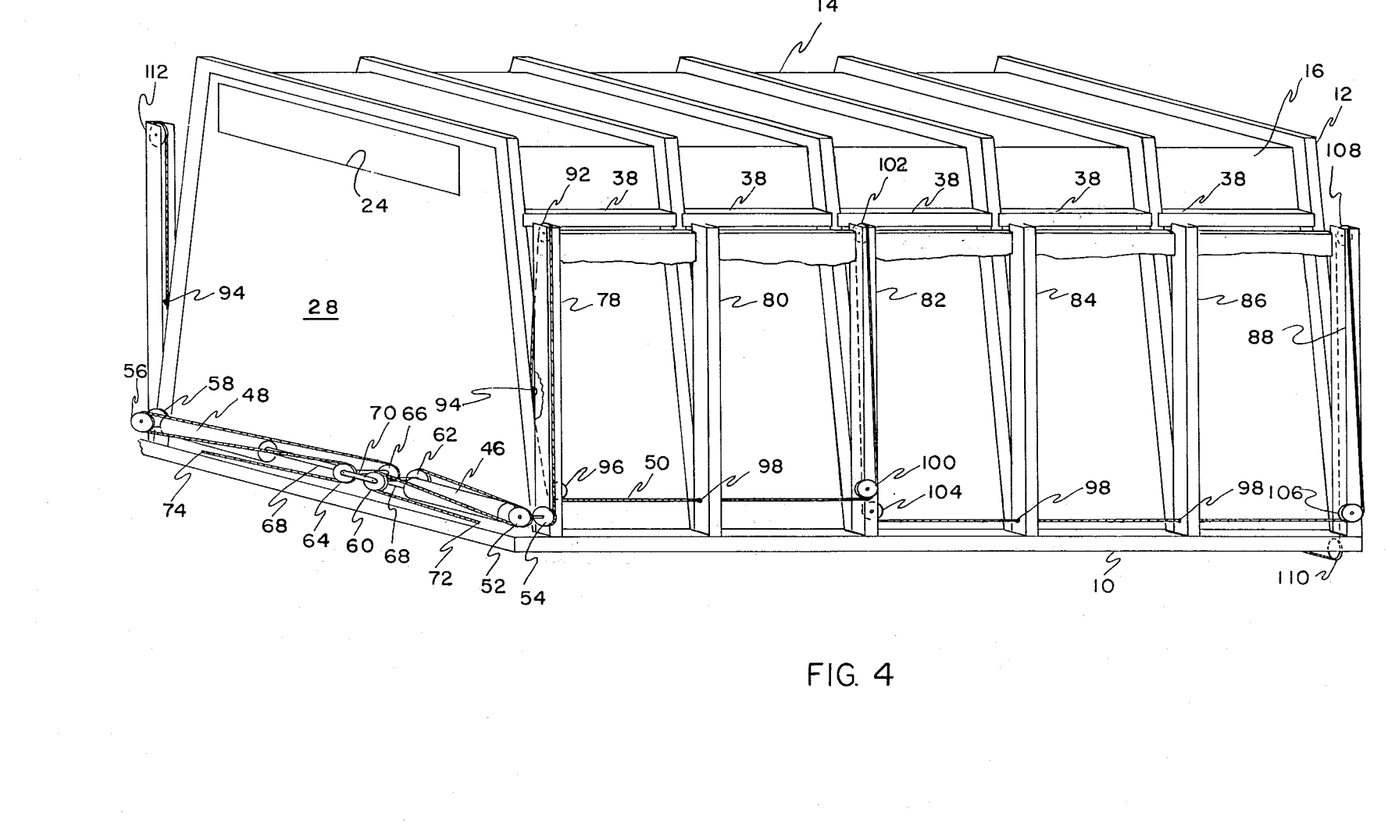
FIG. 4 is a diagrammatic representation showing the mechanism for operating the compacting head of the hay wagon of FIG. 1.

FIG. 4 illustrates the actuating mechanism for the compacting head 12. As shown, the actuating mechanism comprises a pair of opposed fluid cylinders 46 and 48 and a continuous cable 50. Each of the fluid cylinders 46 and 48 has two pulleys mounted at the rear end thereof, as seen at 52, 54, 56 and 58, and has two additional pulleys, as seen at 60, 62, 64 and 66, mounted for movement with the piston rods 68 thereof. The piston rods 68 are coupled by suitable means, such as straps 70, so that the action of fluid cylinders 46 and 48 is complimentary, each driving as the other is exhausting. The ends of the continuous cable 50 are anchored, as seen at 72 and 74. From anchor point 72, the cable 50 passes about pulley 60, carried by the piston rod of cylinder 46, then rearward and about pulley 52 on the rear of fluid cylinder 48, then forwardly and across the top of fluid cylinder 46 and about pulley 62, carried by the piston rod of cylinder 46, and then rearwardly and about pulley 54 at the base of channel member 78 of receptacle 10. Each of the side walls 18 of the receptacle 10 is formed of a plurality of vertically extending, generally U-shaped channel members 78, 80, 82, 84, 86 and 88, which open to the interior of the receptacle 10 and are connected by panels 90 to define the side walls 18. As indicated above, cable 50 passes about pulley 54 at the base of channel member 78 and travels upward, outside of channel member 78, about pulley 92 at the top of channel member 78, and downward, inside channel member 78. The cable 50 is fixedly secured to compacting head 12, as by clip 94, and continues downward and about pulley 96, mounted internally of channel member 78. Thereafter, cable 50 passes horizontally, through suitable openings 98 in channel members 78 and 80 to pulley 100 at the base of channel member 82. The cable 50 passes about pulley 100, upward outside channel member 82, about pulley 102, and downward inside channel member 82 and about interiorly-mounted pulley 104. The portion of cable 50 inside channel member 82 is secured to the compacting head 12 by suitable means, similar to clip 94. Thereafter, cable 50 passes horizontally, through suitable openings 98 in channel members 82, 84 and 86, to pulley 106 at the base of channel member 88. The cable 50 passes about pulley 106 and travels upward outside channel member 88, about pulley 108, downward inside channel member 88, is secured, as by clip 94, to the compacting head 12, and continues downward about pulley 110 and, then, passes under the wagon 2 to the opposite side of the wagon 2. On the opposite side of the wagon 2, the cable 50 travels in a manner similar to that described above, passing upward outside of the channel members, about an upper pulley, and downward inside of the channel members and about a lower pulley. The portion of the cable 50 inside each of the channel members is secured to the compacting head 12 by suitable means, such as clip 94. After passing downward inside channel member 112, the cable 50 passes about pulley 58, at the rear of fluid cylinder 48 and travels forward and about pulley 66 carried by piston rod 68 of fluid cylinder 48. The cable 50 then travels rearward across the top of cylinder 48 and about pulley 56, thence, forward and about pulley 64 to anchor point 74. As shown, the cable 50 travels upward on the outside and downward on the inside of channel members 78, 84 and 88 and the corresponding channel members on the opposite side of the wagon 2. However, it will be apparent that, if desired, the cable 50 could be made to travel similarly about channel members 80, 82 and 86, in addition. The disposition of cable 50 about pulleys 52, 54, 60 and 62 of fluid cylinder 46 and about pulleys 56, 58, 64 and 66 of fluid cylinder 48 causes the movement of the cable 50 to be equal to twice the movement of the piston rods 68 of fluid cylinders 46 and 48.

Figure 5:
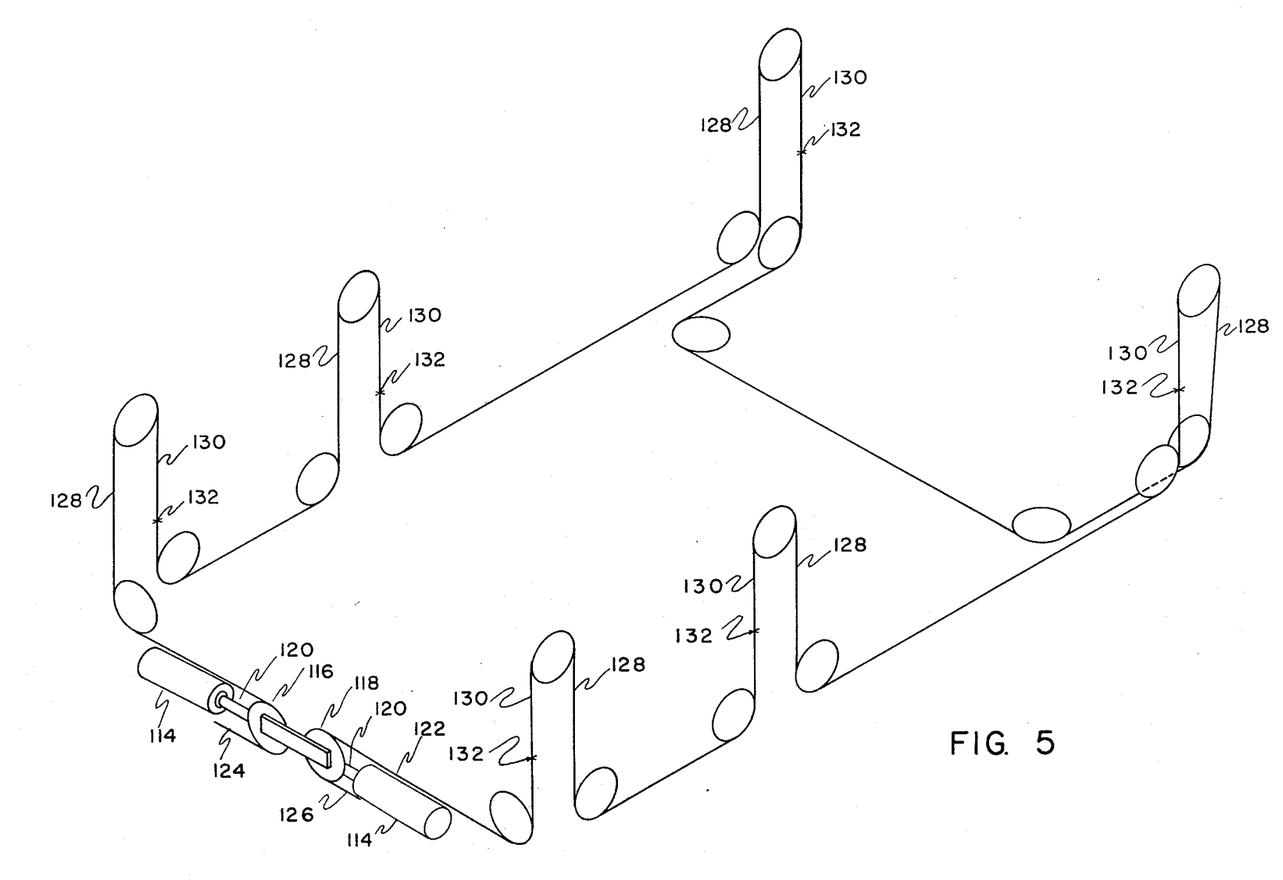
FIG. 5 is a schematic representation showing a mechanism for operating the compacting head of the hay wagon of FIG. 1.

FIG. 5 is a schematic diagram of an alternative system for actuating the compacting head 12 using one double-acting fluid cylinder 114 having pulleys 116 and 118 mounted in tandem on the piston rod 120 of the fluid cylinder 114. The two ends of the continuous cable 122 are secured at anchor points 124 and 126, respectively, and travel about pulleys 116 and 118, respectively, and, thence, to the channel members, in the manner described above. It will be understood that portions 128 of cable 122 pass upward outside of the channel members, while portions 130 of cable 122 pass downward within the channel members and are secured to the compacting head at points 132 by suitable means.

Figure 3:
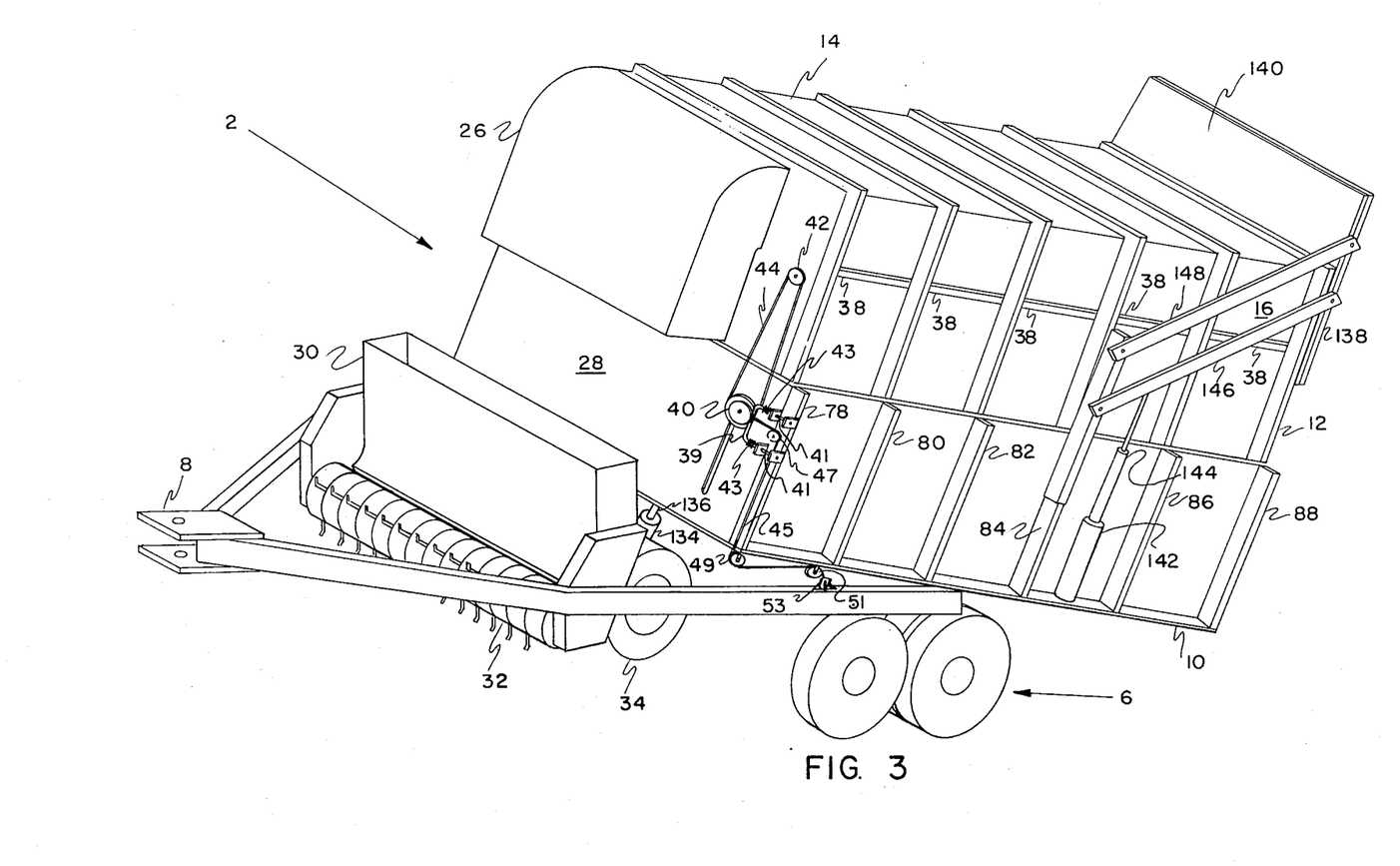
FIG. 3 is an isometric view of the hay wagon of FIG. 1 during the unloading operation.
Figure 6:
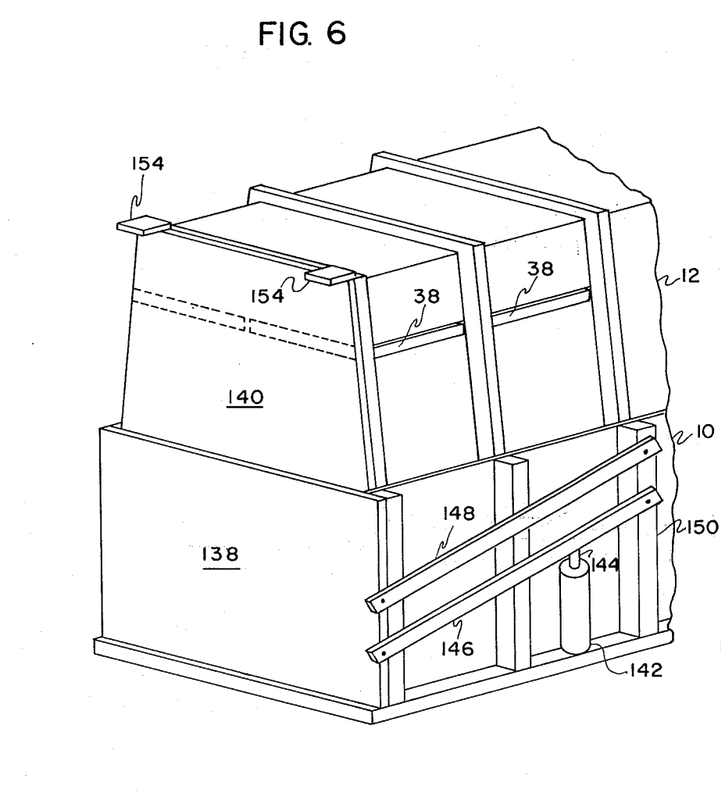
FIG. 6 is an isometric view of the unloading doors of the hay wagon of FIG. 1.
Figure 7:
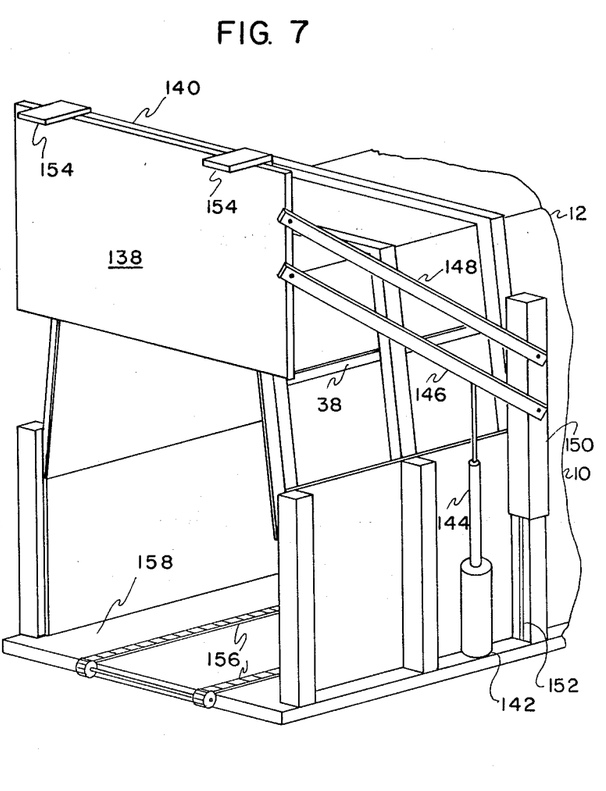
FIG. 7 is an isometric view showing the doors of FIG. 6 in the unloading position.

FIGS. 3, 6 and 7 illustrate the mechanism for unloading the wagon 2. As shown in FIG. 3, a fluid cylinder 134 is mounted on the frame 4 and has a piston rod 136 coupled to the underside of the receptacle 10, while the receptacle 10 is pivotally secured to the frame 4 adjacent the rear end thereof. The bracket 39, which serves to actuate the accumulator doors 38 is slidably mounted on pins 41 which carry springs 43 to normally urge bracket 39 into engagement with pulley 40. However, a chain 45 has one end connected to bracket 39 and passes about pulleys 47, 49 and 51 to an anchor point 53 on the frame 4 to draw bracket 39 out of engagement with pulley 40 during the unloading operation. At the rear end of the wagon 2, the receptacle 10 and compacting head 12 are provided with doors, as seen at 138 and 140, respectively, in FIGS. 6 and 7. Fluid cylinders 142 are provided on each side of the receptacle 10 and have telescoping pistons 144. Door 138 is pivotally connected on each side to one end of each of a pair of parallel rods 146 and 148 which have their opposite ends pivotally connected to a sleeve 150 which is slidable telescopically about channel member 82, as on track 152 from a lowered position, as seen in FIG. 6, to a raised position, as seen in FIG. 7. Piston rod 144 has its free end connected to parallel rod 146 and is extendable, as seen in FIG. 7, to lift parallel rods 146 and 148 to raise and open doors 138 and 140. Door 140 is provided with a pair of horizontal flanges 154 which are engagable by door 138, as it is lifted, and which serve to lift door 140 with door 138 to the fully open position shown in FIG. 7. A pair of endless chains 156 extend substantially the entire length of the floor 158 of receptacle 10 and are operable, by conventional means, to facilitate unloading of the compacted hay when the wagon 2 is tilted.

Figure 8:
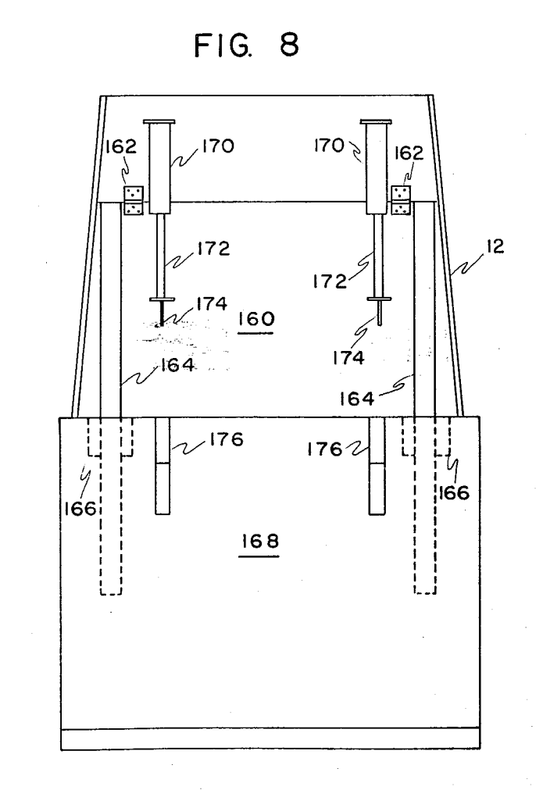
FIG. 8 is a rear elevation of an alternative form of unloadng door for the hay wagon of FIG. 1.
Figure 9:
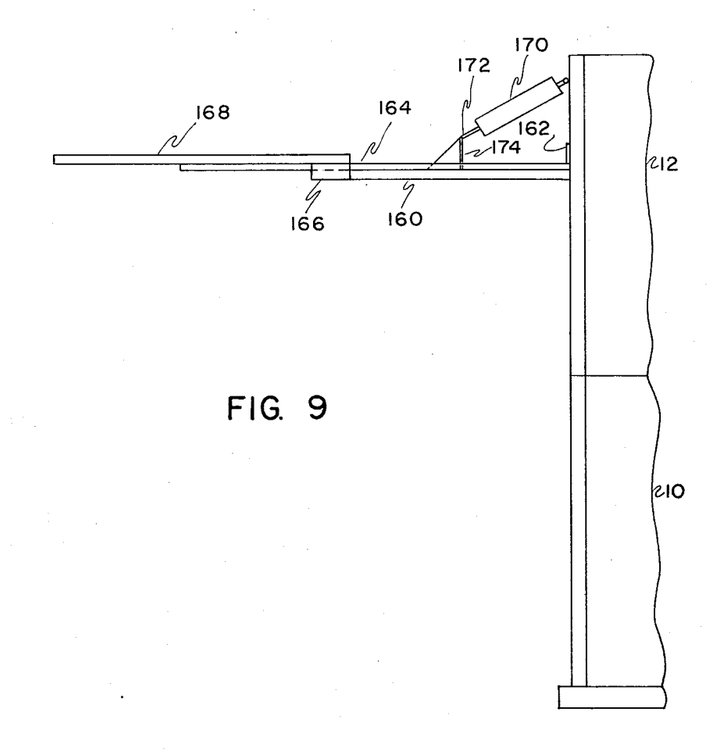
FIG. 9 is a partial side elevation showing the door of FIG. 8 in the unloading position.

FIGS. 8 and 9 illustrate an alternative form of door for unloading the wagon 2. As seen in FIG. 8, an upper door portion 160 is hingedly secured to the rear of the compacting head 12, as at 162, and carries rails 164 which are slidable within brackets 166 mounted on the inner side of a lower door portion 168. A pair of fluid cylinders 170 are mounted on the compacting head 12 and have piston rods 172 which are pivotally secured to brackets 174 mounted on the upper door portion 160. The lower door portion 168 is formed with a pair of slots 176 communicating with the upper edge thereof which receive the brackets 174 during movement of the compacting head 12 in the compacting operation.

In use, the compacting head 12 is, initially, in the raised position, as seen in FIG. 1, and the accumulator doors 38 are in the outward position. As the wagon 2 is pulled, loose hay is picked up from the ground by rotary rake 32 and is delivered, by air from blower 34, through chutes 30 and 26 and opening 24 into the interior of the wagon 2. When desired, fluid cylinders 46 and 48 are actuated to drive pulleys 60–66 to the position shown in FIG. 4. As this occurs the portions of the cable 50 within the channel members will move downward causing clips 94 to move the compacting head 12 downward within receptacle 10 to the position shown in FIG. 2.

When the accumulator doors 38 are provided, the downward movement of the compacting head 12 will cause pulley 40 to engage bracket 39 and to be rotated thereby to cause the accumulator doors 38 to move inwardly through slots 36 to divide the interior of the wagon 2 into an accumulator portion, above the doors 38, and a compacting portion, below the doors 38. Also, chute 26 telescopes downward about chute 30 to permit continued delivery of loose hay into the accumulator portion during the compacting operation.

During the compacting operation, the side walls 16 of the compacting head 12 serve to urge the loose hay toward the center of the receptacle 10, while the roof 14, or accumulator doors 38, if provided, serves to compress the hay downward. Thereafter, fluid cylinders 46 and 48 are actuated to drive pulleys 60–66 toward cylinder 48. As this occurs, the portions of cable 50 within the channel members will move upward, causing clips 94 to raise the compacting head 12 to the position shown in FIG. 1.

As the compacting head 12 moves upward, pulley 40 will again engage bracket 39 and be rotated in the opposite direction to move actuator doors 38 to the open position of FIG. 1 and allowing loose hay delivered into the accumulator portion above the doors 38 to fall into the receptacle 10. It will be apparent that this compacting operation may be repeated, as desired, until the quantity and density of the compacted hay within receptacle 10 prevents further compacting.

When this condition is obtained, the wagon 2 may be towed to a desired unloading spot and fluid cylinders 134 and 142 will be actuated. Fluid cylinder 134 raises the front end of the receptacle 10 to the position shown in FIG. 3. As this occurs, chute 26 is lifted clear of chute 30 and chain 45 serves to retract bracket 39 to prevent further actuation of the accumulator doors 38. Where necessary or desirable, chute 26 may be hingedly secured to the compacting head 12. Meanwhile, fluid cylinder 142 raises doors 138 and 140 to a point above the level of the accumulator doors 38 and endless chains 156 are actuated to eject the compacted hay from the wagon 2. Thereafter, the wagon 2 may be returned to the position shown in FIG. 1 to continue the hay gathering operation.

Due to the inclined side walls 16 of the compacting head 12, the hay will be forced away from the side walls 18 of the receptacle 10 toward the center of the wagon 2, as it is compacted, while the roof 14 or accumulator doors 38 forces the hay downward and then moves upward away from the hay. As a result, a densely compressed stack of hay is produced having a configuration similar to that of the interior of the wagon 2, as seen in FIG. 7, but of lesser dimensions, so that the compressed stack of hay is not in contact with either the side walls 18 of receptacle 10 or the compacting head 12. Thus, when the wagon 2 is tilted, as in FIG. 3, for unloading, the compressed stack of hay will engage only the floor 158 of the receptacle 10 and chains 156 can easily drive the compressed stack out of the wagon 2 onto the ground. With the above-described configuration of the compressed hay stack, it is found that the compressed hay stack is self-containing, whereas, if the sides of the stack were vertical, they would tend to collapse or fall away from the stack. Because the hay is densely compacted, when the compressed hay is left in the field for storage, rain and other moisture are less able to penetrate the stack, while the natural juices of the hay are less subject to evaporation. Moreover, the inclined sides of the compressed hay stack tend to shed rain and snow, in a manner similar to the roof of a house, which further reduces moisture penetration. As a result, there is less likelihood of rotting or spontaneous combustion and there is greater nutritional value than is obtained with conventionally stacked hay.

Another unobvious advantage is obtained by the use of continuous cable 50 for actuating the compacting head 12. As is well known, the moisture content of hay varies considerably, even from point to point within a given field, and moist hay is more difficult to compress than dry hay. Furthermore, as in any loading operation, the distribution of loose hay within the receptacle 10 may be non-uniform. Thus, the resistance of the hay to compression by compacting head 12 is likely to be non-uniform also. However, the cable 50 has a certain amount of inherent resilience and, consequently, will tend to stretch at those points where resistance to compression is greater. At the same time, such stretching will apply an additional compressing force to the hay in the high resistance region which will tend to force the hay toward regions of less resistance and, consequently, results in more uniform distribution and eliminates air in the stack to prevent burning.

Obviously, numerous variations and modifications may be made without departing from the present invention. Accordingly, it should be clearly understood that the form of the present invention described above and shown in the accompanying drawing is illustrative only and is not intended to limit the scope of the present invention.

What is claimed is:

1. The method of gathering crop comprising the steps of:

delivering loose crop into a wagon, physically separating the interior of said wagon into a compacting chamber and an accumulator chamber, compacting the crop in said compacting chamber, delivering loose crop into said accumulator chamber during said compacting step, maintaining the delivered crop in the accumulator chamber spaced from the crop in the compacting chamber during the compacting step, and delivering accumulated crop from said accumulator chamber into said compacting chamber upon completion of said compacting step.

* * * * *